(12) United States Patent
Ryoo et al.

(10) Patent No.: US 11,165,107 B2
(45) Date of Patent: Nov. 2, 2021

(54) BATTERY DEVICE, BATTERY MONITORING DEVICE AND BATTERY MONITORING METHOD

(71) Applicant: Samsung Electronics Co., Ltd., Gyeonggi-do (KR)

(72) Inventors: Jae Min Ryoo, Gyeonggi-do (KR); Jeong Nam Cheon, Gyeonggi-do (KR); Mi Hyun Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 73 days.

(21) Appl. No.: 15/941,249

(22) Filed: Mar. 30, 2018

(65) Prior Publication Data

US 2018/0287224 A1  Oct. 4, 2018

(30) Foreign Application Priority Data

Mar. 31, 2017  (KR) .......................... 10-2017-0042098

(51) Int. Cl.
*H01M 10/48* (2006.01)
*G01N 29/44* (2006.01)
(Continued)

(52) U.S. Cl.
CPC ......... *H01M 10/484* (2013.01); *G01M 3/045* (2013.01); *G01M 3/226* (2013.01);
(Continued)

(58) Field of Classification Search
CPC .. H01M 10/484; H01M 10/48; H01M 10/486; H01M 2220/30; G01M 3/045;
(Continued)

(56) References Cited

U.S. PATENT DOCUMENTS 8,596,862 B1   12/2013   Pfeifer et al.
10,247,783 B2   4/2019   Mensah-Brown
(Continued)

FOREIGN PATENT DOCUMENTS

CN   103898379   7/2014
CN   105437989   3/2016
(Continued)

OTHER PUBLICATIONS

English translation of KR20100006491U (Year: 2010).*
(Continued)

*Primary Examiner* — Christopher P Domone
*Assistant Examiner* — Kimberly Wyluda
(74) *Attorney, Agent, or Firm* — The Farrell Law Firm, P.C.

(57) ABSTRACT

Disclosed is a battery device including a battery; a plurality of sensors attached to the battery; and a transceiving circuit configured to transmit a signal received from a monitoring device to the plurality of sensors and to transmit signals received from the plurality of sensors to the monitoring device. The plurality of sensors generate surface acoustic waves (SAWs) in response to the signal received from the monitoring device, when receiving the signal from the monitoring device through the transceiving circuit, and the plurality of sensors include at least one first sensor configured to output a first signal corresponding to a SAW varied depending on a temperature of the battery; at least one second sensor configured to output a second signal corresponding to a SAW varied depending on pressure of the battery; and at least one third sensor configured to output a third signal corresponding to a SAW varied depending on an electrolyte leakage state of the battery.

17 Claims, 15 Drawing Sheets

(51) Int. Cl.
*G01N 29/07* (2006.01)
*G01M 3/04* (2006.01)
*G01N 29/24* (2006.01)
*G01M 3/22* (2006.01)

(52) U.S. Cl.
CPC ......... *G01N 29/07* (2013.01); *G01N 29/2468* (2013.01); *G01N 29/4436* (2013.01); *H01M 10/48* (2013.01); *H01M 10/486* (2013.01); *G01N 2291/012* (2013.01); *G01N 2291/014* (2013.01); *G01N 2291/0423* (2013.01); *H01M 2220/30* (2013.01)

(58) Field of Classification Search
CPC ... G01M 3/226; H01N 29/07; H01N 29/2468; H01N 29/4436; G01N 2291/012; G01N 2291/014; G01N 2291/0423
See application file for complete search history.

(56) References Cited

U.S. PATENT DOCUMENTS

| | | | |
|---|---|---|---|
| 2007/0229294 A1* | 10/2007 | Vossmeyer | H01M 10/4207 340/636.19 |
| 2010/0102975 A1 | 4/2010 | Vossmeyer et al. | |
| 2015/0155545 A1* | 6/2015 | Baek | H01M 10/4257 429/7 |
| 2016/0084911 A1 | 3/2016 | Mensah-Brown | |
| 2018/0040927 A1* | 2/2018 | Rejman | H01M 2/1055 |

FOREIGN PATENT DOCUMENTS

| | | | | |
|---|---|---|---|---|
| DE | 102016203422 A1 | * | 9/2016 | ............ B25F 5/02 |
| JP | 2000077831 A | * | 3/2000 | |
| KR | 1020070098691 | | 10/2007 | |
| KR | 20100006491 U | * | 6/2010 | |
| KR | 1020110003667 | | 1/2011 | |
| KR | 20130129040 A | * | 11/2013 | |
| WO | WO 2013/131687 | | 9/2013 | |

OTHER PUBLICATIONS

Beghi, Marco. Modeling and Measurement Methods for Acoustic Waves and for Acoustic Microdevices. InTech, 2013, see p. 358. (Year: 2013).*
EPO machine generated English translation of JP-2000-077831-A (Year: 2000).*
EPO machine generated English translation of KR-2013-0129040-A (Year: 2013).*
ASM International Handbook Committee. (1994). ASM Handbook, vol. 05. Table 2 Physical and mechanical properties of selected ceramics, metals, and a polymer. P163. https://app.knovel.com/hotlink/pdf/id:kt007OAXE2/asm-handbook-volume-05/grindability-ceramics (Year: 1994).*
European Search Report dated Jul. 6, 2018 issued in counterpart application No. 18164432.9-1108, 5 pages.
Chinese Office Action dated Sep. 10, 2020 issued in counterpart application No. 201810295186.6, 17 pages.
Korean Office Action dated Sep. 13, 2021 issued in counterpart application No. 10-2017-0042098, 24 pages.

* cited by examiner

1010: ▨ TEMPERATURE WARNING
1020: ▦ PRESSURE WARNING
1030: ▩ ELECTROLYTE WARNING
1040: ○ SERVICE CENTER VISIT REQUIRED ns BATTERY DEVICE, BATTERY
MONITORING DEVICE AND BATTERY
MONITORING METHOD

CROSS-REFERENCE TO RELATED APPLICATION(S)

This application is based on and claims priority under 35 U.S.C. § 119 to Korean Patent Application No. 10-2017-0042098, filed on Mar. 31, 2017, in the Korean Intellectual Property Office, the disclosure of which is incorporated by reference herein its entirety.

BACKGROUND

1. Field

The present disclosure relates generally to a battery device, a battery monitoring device, and a battery monitoring method, capable of monitoring a battery state.

2. Description of Related Art

A portable electronic device may include a battery and may operate by using battery power. Since the battery could possibly explode, the battery has a protecting circuit which limits the charging/discharging range of power to reduce the risk of an explosion.

The electronic device may include an additional monitoring device which is able to detect whether the battery is in an abnormal state. For example, the electronic device may include a temperature sensor which determines whether the battery is in an abnormal state, as the electronic device measures a battery temperature.

Since the battery monitoring device may be provided in the electronic device and may be driven by receiving battery power, the battery monitoring device may determine whether the battery is in an abnormal state, only while the battery is being used.

Since the battery monitoring device determines a battery state by using the temperature sensor, the battery monitoring device may be able to detect battery deformation (e.g., swelling, electrolyte leakage, etc.).

SUMMARY

Aspects of the present disclosure are to address at least the above-mentioned problems and/or disadvantages and to provide at least the advantages described below. Accordingly, an aspect of the present disclosure is to provide a battery device, a battery monitoring device, and a battery monitoring method, capable of determining a battery state.

In accordance with an embodiment, a battery device includes a battery; a plurality of sensors attached to the battery; and a transceiving circuit configured to transmit a signal received from a monitoring device to the plurality of sensors and to transmit signals received from the plurality of sensors to the monitoring device. The plurality of sensors generate surface acoustic waves (SAWs) in response to the signal received from the monitoring device, when receiving the signal from the monitoring device through the transceiving circuit, and the plurality of sensors include at least one first sensor configured to output a first signal corresponding to a SAW varied depending on a temperature of the battery; at least one second sensor configured to output a second signal corresponding to a SAW varied depending on pressure of the battery; and at least one third sensor configured to output a third signal corresponding to a SAW varied depending on an electrolyte leakage state of the battery.

In accordance with an embodiment, a battery monitoring system includes a sensor device attached to a battery and a monitoring device. The sensor device is configured to generate a SAW corresponding to a first signal received in the sensor device, and configured to output a plurality of second signals corresponding to SAWs varied depending on a plurality of states of a temperature of the battery, pressure of the battery, and an electrolyte leakage of the battery, respectively; and the monitoring device is configured to transmit the first signal, which is used to generate the SAW, to the sensor device, to receive the plurality of second signals from the sensor device, and to identify the states of the battery by analyzing the plurality of second signals.

In accordance with an embodiment, a battery monitoring method by at least one processor includes transmitting a first signal to a plurality of sensors attached to a battery; receiving a plurality of second signals corresponding to SAWs which are generated differently, based on the transmitted first signal, depending on a plurality of states of a temperature state of the battery, a pressure state of the battery, and an electrolyte leakage state of the battery; and outputting information corresponding to a plurality of states of a temperature, pressure, and an electrolyte leakage of the battery by analyzing the second signals.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION

Those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C", etc. may include all possible combinations of one or more of the associated listed items. The terms such as "first", "second", etc. used herein may refer to various elements regardless of the order and/or priority of the elements and may be used to distinguish an element from another element, but does not limit the elements. When an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with the expressions "suitable for", "having the capacity to", "changed to", "made to", "capable of", "designed to", or "adapted to" in hardware or software. The expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Figure 1:
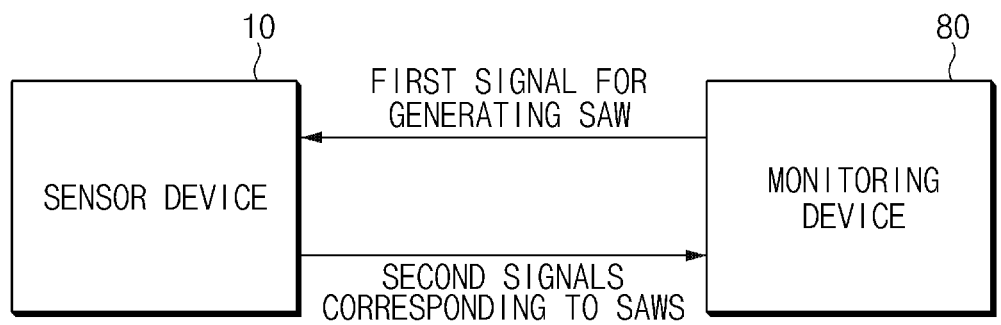
FIG. 1 is a block diagram illustrating a battery monitoring system, according to an embodiment.

FIG. 1 is a block diagram illustrating a battery monitoring system, according to an embodiment.

Referring to FIG. 1, a battery monitoring system 1800 may include a sensor device 10 and a monitoring device 80.

According to an embodiment, the sensor device 10 may include a temperature sensor, which is able to detect the variation in the temperature of a battery, a pressure sensor, which is able to detect the variation in pressure of the battery, and a plurality of sensors which is able to detect whether an electrolyte leaks. Each of the plurality of sensor may be a SAW sensor which generates, when receiving a signal from the monitoring device 80, a SAW corresponding to the received signal and outputs a signal corresponding to a SAW varied depending on the temperature or the pressure of the battery or the leakage state of the battery. The sensor device 10 may include a temperature sensor and a pressure sensor, may include a temperature sensor and an electrolyte sensor, or may include a temperature sensor, a pressure sensor, and an electrolyte sensor.

According to an embodiment, the sensor device 10 may be configured to prevent the interference between a transmit channel and a receive channel A transmission line of the sensor device 10 splits a signal, which is received from the monitoring device 80, at one node and simultaneously transmits split signals to a plurality of sensors. Therefore, there may be a reduction of interference caused in the process of transmitting the signal to a plurality of sensors. Sensors provided in the sensor device 10 may generate SAWs after delaying received signals to different times and may transmit signals corresponding to the SAWs varied depending on the battery state. Therefore, the interference between transmitted and received signals of the sensors may be prevented.

According to an embodiment, the sensor device 10 may be provided at different positions of the battery for detecting the temperature, the pressure, or the electrolyte leak of the battery. The temperature sensor may be provided at positions within the battery, which represents the widest variations in the temperature of the battery. The pressure sensor may be provided at a position (e.g., the center of at least one of the top surface, the bottom surface, or the side surface) within the battery, which represents the regions of the battery that experience the most swelling. The electrolyte sensor may be provided at a position, such as a region adjacent to the battery terminal (e.g., a positive or a negative terminal), in which the electrolyte frequently leaks.

According to an embodiment, the sensor device 10 may be attached to the battery by using an adhesive. The sensor device 10 may be attached to the battery by using a double-sided tape. The sensor device 10 may be provided inside the battery to more precisely detect a battery state. For example, the temperature sensor may be attached to the battery by using a thermal interface material (TIM) as an adhesive method. Therefore, heat of the battery is smoothly transferred to the temperature sensor and thus the temperature of the battery may be more precisely detected.

According to an embodiment, the sensor device 10 may communicate with the monitoring device 80 in a wired communication manner or a wireless communication manner. The sensor device 10 may include an antenna and may receive a first signal from the monitoring device 80 and transmit a second signal, by using the antenna. The sensor device 10 may include a connector and may be electrically connected with the monitoring device 80 through the connector. The sensor device 10 may be a passive device driven by using power from the monitoring device 80 regardless of an interface path between the sensor device 10 and the monitoring device 80.

According to an embodiment, the monitoring device 80 may transmit the first signal to the sensor device 10 to determine the battery state and may receive a plurality of second signals corresponding to SAWs varied depending on a plurality of battery states.

According to an embodiment, the monitoring device 80 may determine a temperature variation state of the battery, a pressure variation state of the battery, and an electrolyte leakage state of the battery, by analyzing the second signals. The monitoring device 80 may determine the variations (e.g., phase shift and frequency shift) of the second signals based on the first signal and may determine the temperature, the pressure, and the electrolyte leakage state of the battery by using the determined variations of the second signals.

According to an embodiment, the monitoring device 80 may be configured to distinguish between the second signals received from the sensors provided in the sensor device 10. Since the sensors transmit the second signals depending on the battery state at different times, the monitoring device 80 may distinguish among the second signals, such as a response signal representing the variation in the temperature of the battery, a response signal representing the variation in the pressure of the battery, and a response signal representing the electrolyte leakage state, based on the sequence of receiving the second signals.

According to an embodiment, the monitoring device 80 may notify the analyzed battery state (e.g., the temperature, the pressure, and the electrolyte leakage state). The monitoring device 80 may display, on a display, the battery state in the form of a text, an icon, etc. When recognizing the abnormal temperature, the abnormal pressure, or the electrolyte leakage of the battery, the monitoring device 80 may turn on a plurality of light emitting diodes (LEDs) for indicating the abnormal temperature, the abnormal pressure, or the electrolyte leakage of the battery. The monitoring device 80 may notify about the abnormal state of the battery through a speaker (or a buzzer).

According to an embodiment, the monitoring device 80 may restrict the charging of the battery when at least one of the temperature of the battery, the pressure of the battery, and the electrolyte leakage of the battery is greater than or equal to a specified reference value. The monitoring device 80 may be a charger (e.g., a wireless charger) to charge the battery. In this case, the charger may not supply a charging current to the battery, when recognizing the abnormal state in the temperature or the pressure of the battery, or the electrolyte leakage of the battery.

According to an embodiment, the monitoring device 80 may notify about the abnormal state of the battery to the electronic device using battery power, when at least one of the temperature of the battery, the pressure of the battery, and the electrolyte leakage of the battery is greater than or equal to a specified reference value according to the analyzing result of at least one response signal. The monitoring device 80 may be a wireless charger to notify a battery state (e.g., the abnormal state of the battery) to the electronic device while charging the battery with power.

According to an embodiment, the monitoring device 80 may be provided with a battery test jig to test a single battery product having the sensor device 10 attached thereto. Alternatively, the monitoring device 80 may be provided to the electronic device using the charger (e.g., a wireless charger), which charges the battery with power, or the electronic device using the battery power. In this case, the monitoring device 80 may monitor the abnormal state of the battery before charging the battery with power. The monitoring device 80 may be included in each of the electronic device and the wireless charger. In this case, when the electronic device is mounted on the wireless charger, the monitoring device of the wireless charger may monitor the battery for the abnormal state. When the electronic device is not mounted on the wireless charger, the electronic device may monitor the battery for the abnormal state. The monitoring device 80 may determine the abnormal state of the battery by using the sensor device 10 even before the power of the battery is used.

Figure 2:
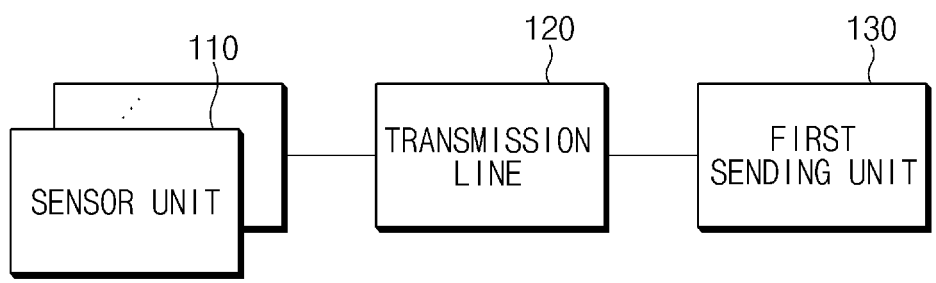
FIG. 2 is a block diagram illustrating a sensor device, according to an embodiment.

FIG. 2 is a block diagram illustrating a sensor device, according to an embodiment.

Referring to FIG. 2, the sensor device 10 may include at least one sensor unit 110 (e.g., a sensor circuit, a sensor device, or a sensor module), a transmission line 120, and a first sending unit 130.

According to an embodiment, at least one sensor unit 110 may include a plurality of sensors among at least one temperature sensor, at least one pressure sensor, and at least one electrolyte sensor. The sensor unit 110 may include a temperature sensor and a pressure sensor, may include a temperature sensor and an electrolyte sensor, or may include a temperature sensor, a pressure sensor, and an electrolyte sensor. The sensor unit 110 may include a plurality of temperature sensors, a plurality of pressure sensors, or a plurality of electrolyte sensors.

According to an embodiment, each sensor of the sensor unit 110 may include a piezoelectric plate, a transducer, and a reflective plate. The surrounding temperature, pressure, or the leakage of electrolyte may cause the expansion or contraction of the delay line or a change in the physical properties of the piezoelectric substrate. The expansion or contraction of the delay line or changes in the physical properties of the piezoelectric substrate may cause the piezoelectric substrate to change the SAW signal. The transducer may change an input (e.g., alternating current (AC)) electrical signal into a SAW, or may convert the SAW reflected from a reflective plate into an electrical signal. The transducer may be an inter-digit transducer (IDT) having, for example, a comb-shaped electrode. The reflective plate may reflect a SAW, which is received from the traducer, from an end portion of the delay line such that the SAW is propagated through the transducer again. The temperature sensor may output a signal corresponding to a SAW varied as the piezoelectric plate is varied depending on the temperature of the battery. The pressure sensor may output a signal corresponding to a SAW varied as the piezoelectric plate is varied depending on the pressure of the battery. The electrolyte sensor may include a chemical material reacting with an electrolyte and may output a signal corresponding to a SAW varied as the chemical material reacting with the electrolyte changes the physical property of the piezoelectric plate.

According to an embodiment, each sensor unit 110 and a plurality of sensors provided in the sensor unit 110 may include delay lines which delay received signals to different times. When the sensor device 10 includes first to third sensor units 110, the first to third sensor unit 110 may have delay lines having different lengths. Accordingly, the first sensor unit 110 may be configured to transmit a signal during a first section of the receive channel, the second sensor unit 110 may be configured to transmit a signal during a second section of the receive channel, or the third sensor unit 110 may be configured to transmit a signal during a third section of the receive channel. In addition, since each sensor unit 110 includes a plurality of sensors, as the sensors delay the transmission times of the received signals to different times, the sensors may transmit signals about the battery state at different times. The first section of the receive channel may be time-divided into three sub-sections for receiving signals from the temperature sensor, the pressure sensor, and the electrolyte sensor. Even if a plurality of sensors are used, as the transmit/receive channels of each sensor are separated, the interference between the transmitted or received signal is reduced.

According to an embodiment, the sensors included in the sensor unit 110 may be provided at positions for sensing the abnormal state of the battery based on the temperature, the pressure, or the electrolyte leakage of the battery. The temperature sensor may be provided at the position which represents the widest variations in the temperature of the battery device. The pressure sensor may be provided at a position (e.g., the center of at least one of the top surface, the bottom surface, or the side surface) of the battery, which represents the regions of the battery that experience the most swelling. The electrolyte sensor may be provided at a position, such as a region adjacent to the battery terminal (e.g., the positive or negative terminals), in which the electrolyte frequently leaks. In addition, the sensors included in the sensor unit 110 may be disposed adjacent to each other.

According to an embodiment, the transmission line 120 may support a signal, which is received from the monitoring device 80 through the first sending unit 130, to be transmitted to at least one sensor unit 110 through a transmit channel. The transmission line 120 may split a signal, which is received from the monitoring device 80 through the first sending unit 130, at one node and transmit split signals to the at least one sensor unit 110. The transmission line 120 may connect the at least one sensor unit 110 with the first sending unit 130 configured in the shape of a star network. The transmission line 120 may connect an input/output terminal of the sensor unit 110 with the sensors configured in the shape of the star network.

According to an embodiment, the first sending unit 130 may transmit the first signal to the transmission line 120 when receiving the first signal from the monitoring device 80. In addition, the first sending unit 130 may transmit a plurality of second signals to the monitoring device 80 when receiving the second signals from the at least one sensor unit 110 through the transmission line 120. The first sending unit 130 may be an antenna which receives a signal in a specified band from the monitoring device 80 and propagates a signal, which is received from the at least one sensor unit 110, in a specified frequency band. The first sending unit 130 may be a contact device (e.g., a connector, or a contact terminal) electrically connected with a contact device (e.g., a connector, or a contact) provided in the monitoring device 80.

According to an embodiment, the first sending unit 130 may be provided at a position that does not affect another function (e.g., communication) of the monitoring device 80 or an electronic device using battery power. If the monitoring device 80 is a wireless charger which wirelessly charges the battery, the first sending unit 130 may be an antenna which receives a signal from the monitoring device 80. In this case, since a wireless charging antenna is applied to the electronic device, the first sending unit 130 may be provided at a position that has relative less effect on the reception of power from the wireless charger to the battery.

Figure 3:
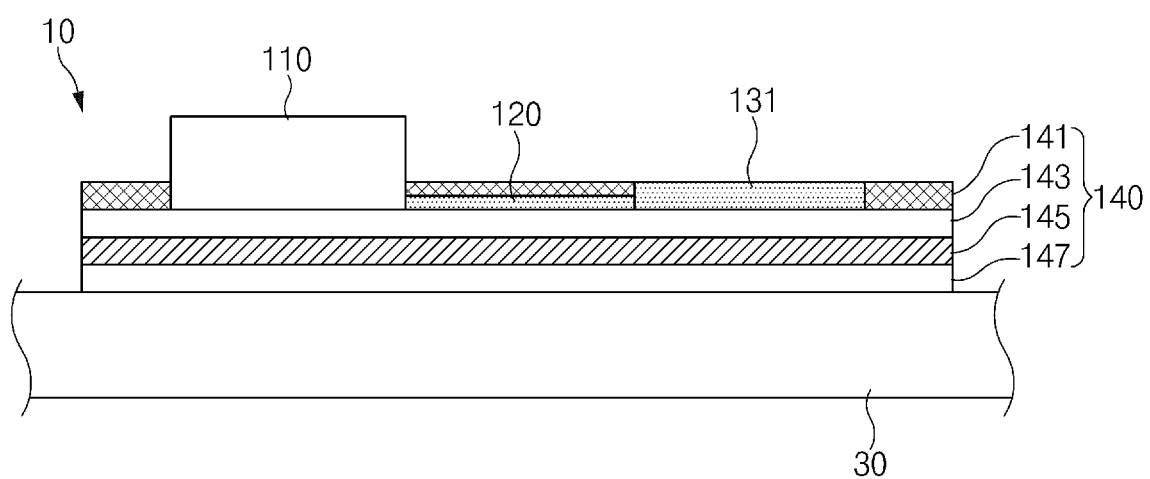
FIG. 3 is a sectional view illustrating a sensor device, according to an embodiment.

FIG. 3 is a sectional view illustrating the sensor device, according to an embodiment.

Referring to FIG. 3, the sensor device 10 may be configured by using a flexible printed circuit board (FPCB) 140. The sensor unit 110 may be mounted on the FPCB 140 through, for example, a surface mount technology (SMT). The transmission line 120 may be a pattern formed on the FPCB 140 and the first sending unit 130 may be an antenna 131 configured in a pattern on the FPCB 140. Alternatively, the first sending unit 130 may be an antenna (or a connector) mounted on the FPCB 140. According to an embodiment, as the sensor device 10 is attached to a battery 30 by using an FPCB 140 having a lower height, the more precise detection of the battery state may be determined.

According to an embodiment, the FPCB 140 may include a first insulator 141, a plurality of conductors (e.g., transmission line 120, and antenna 131), a second insulator 143, a ferrite 145, and a bonding layer 147. The first insulator 141 may cover first surfaces of the plurality of conductors to prevent the plurality of conductors from being exposed. The plurality of conductors may be copper patterns formed on the FPCB 140. The second insulator 143 may cover second surfaces of the plurality of conductors to prevent the plurality of conductors from being exposed. The ferrite 145 may prevent a signal received from the first sending unit 130 from affecting the battery. The bonding layer 147 may bond the FPCB 140 onto an outer surface of the battery 30. The bonding layer 147 may be a double-sided tape having a first face bonded to the ferrite 145 and a second face bonded to the battery 30 to be sensed by the sensor device 10. The bonding layer 147 may be formed of a TIM.

According to an embodiment, the FPCB 140 may be configured in various shapes and various sizes depending on the positions of the sensor unit 110 and the first sending unit 130.

Figure 4:
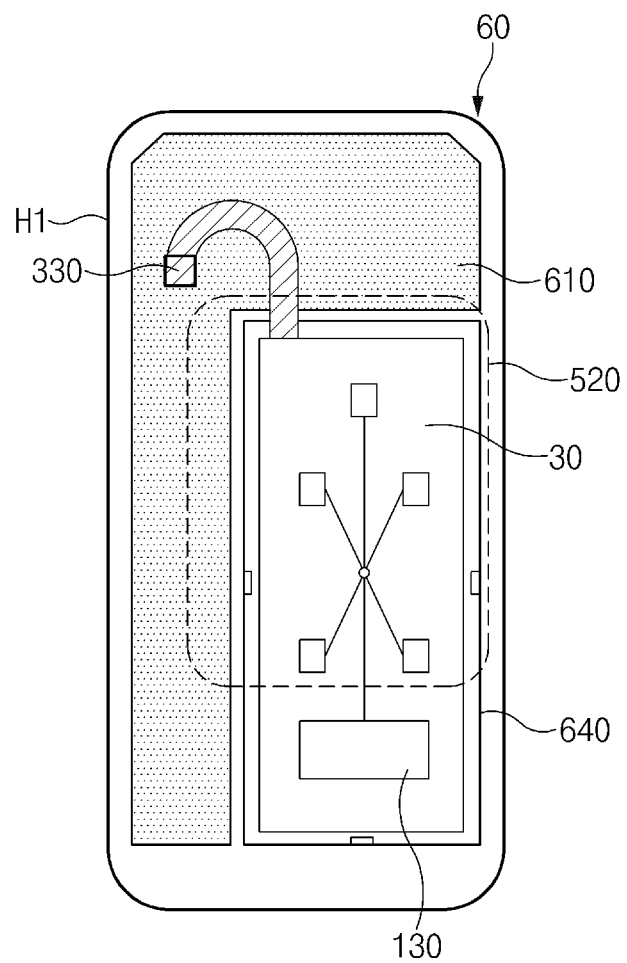
FIG. 4 is a view illustrating an electronic device using a battery with a sensor device using wireless communication, according to an embodiment.

FIG. 4 is a view illustrating an electronic device includes a battery with a sensor device using wireless communication, according to an embodiment.

Referring to FIG. 4, the electronic device 60 may include a first space 640 in which the battery 30 is mounted inside a rear housing of the electronic device 60. The electronic device 60 (e.g., a main board 610) may be electrically connected with the battery 30, which is mounted in the first space 640, through a battery connector 330 to receive battery power. The battery 30 mounted in the first space 640 may be protected due to the rear housing being assembled with a side housing H1 of the electronic device 60.

According to an embodiment, the sensor device 10 may be attached onto a position of the battery 30, which has relative less effect on an element (e.g., an antenna) for a different function of the electronic device 60. For example, since an antenna for first communication (e.g., 4G communication systems, wireless fidelity (WiFi), Bluetooth™ etc.) is applied to the main board 610 of the electronic device 60, the sensor device 10 may be attached to the rear surface of the battery 30, for example, a surface of the battery 30 which is not coupled to the electronic device 60. A second antenna 520 for second communication (e.g., wireless battery charging, near field communication (NFC), or magnetic secure transmission (MST)) of the electronic device 60 may be interposed between the rear surface of the battery 30 and the rear housing of the electronic device 60. In this case, the antenna of the sensor device 10 may be provided at a position that has relative less effect on the transmission or reception of the second antenna. The first sending unit 130 of the sensor device 10 may be spaced apart from the second antenna 520 by a predetermined distance.

Figure 5:
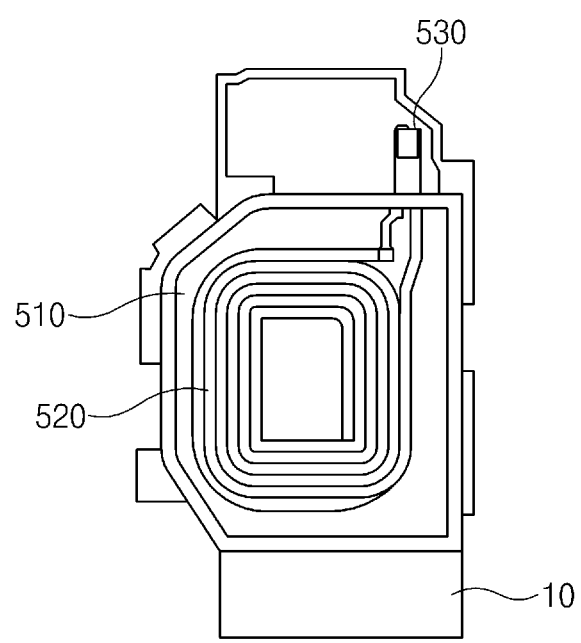
FIG. 5 is a view illustrating the implementation of a sensor device, according to an embodiment.

FIG. 5 is a view illustrating the implementation of the sensor device, according to an embodiment.

Referring to FIG. 5, the sensor device 10 may be configured to use the same substrate as another element. The second antenna 520 for the second communication of the electronic device may be interposed between the rear surface of the battery (e.g., see reference numeral 30 of FIG. 4), to which the sensor device 10 is applied and the rear housing of the electronic device (e.g., see reference numeral 60 of FIG. 4). In this case, the second antenna 520 may be formed on a second FPCB 510. In this case, the sensor device 10 may be configured to be spaced apart from the second antenna 520 by a predetermined distance on the second FPCB 510. Since the sensor device 10 is attached to the battery, a bonding layer may be formed on the rear surface of the sensor device 10.

According to an embodiment, the sensor device 10 may perform wired communication or wireless communication. When the sensor device 10 performs the wired communication, the sensor device 10 may be connected with the monitoring device (e.g., see reference numeral 80 of FIG. 1) through a contact 530 of the second antenna 520 formed on the second FPCB 510. The sensor device 10 may be connected with the contact 530 of the second antenna 520 and may be connected with the monitoring device as the contact 530 is electrically connected with (e.g., soldered to) the main board of the electronic device including the monitoring device.

Figure 6:
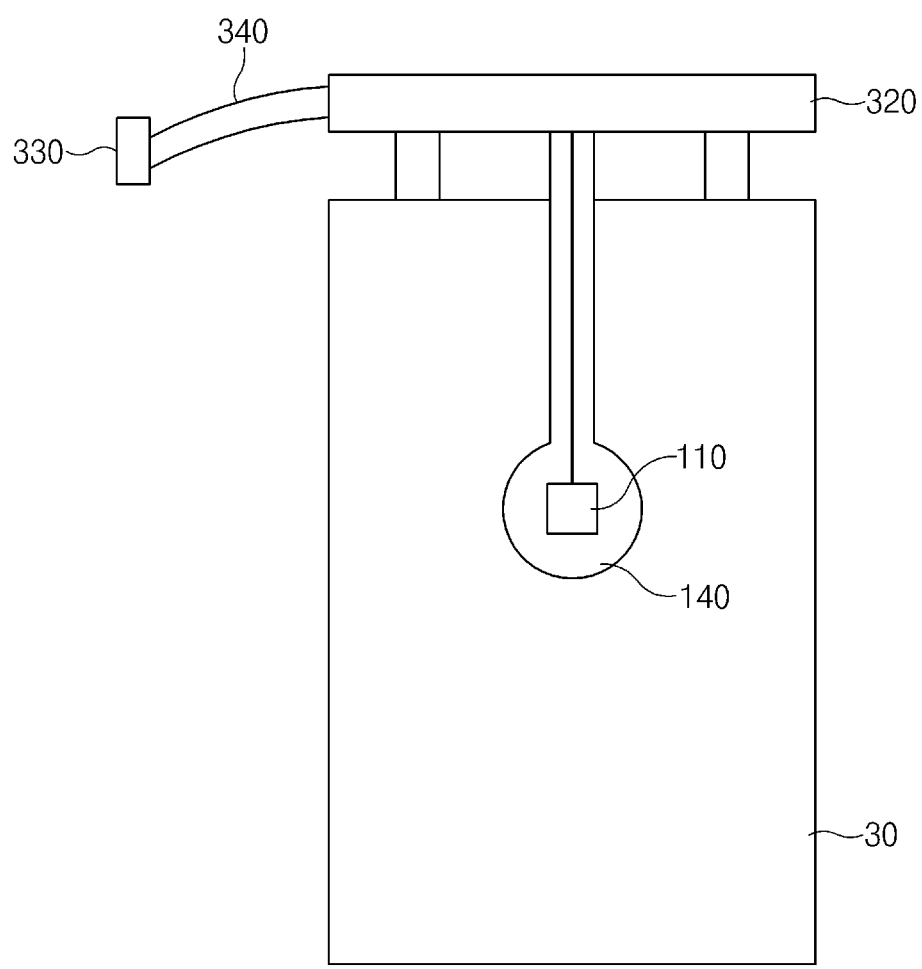
FIG. 6 is a view illustrating a sensor device, according to an embodiment.

FIG. 6 is a view illustrating the sensor device, according to an embodiment.

Referring to FIG. 6, the sensor device (e.g., see reference numeral 10 of FIG. 1) may be configured to be connected with the monitoring device (e.g. see reference numeral 80 of FIG. 1) electrically (e.g., in a wired manner) through a battery connector 330. The monitoring device may be the electronic device using battery power.

According to an embodiment, the sensor device may be attached to one surface of the battery 30 and may be connected with a battery protecting circuit 320 in a wired manner. The battery protecting circuit 320 may be a protection circuit module (PCM) circuit to prevent the battery from being charged beyond a specified maximum voltage, and from being discharged below to a specified minimum voltage.

According to an embodiment, the FPCB 140 is formed to connect the sensor unit 110 with the battery protecting circuit 320. A first end of the FPCB 140 may be attached to one area of the battery 30 and a second end of the FPCB 140 may be soldered to a substrate of the battery protecting circuit 320. The battery protecting circuit 320 may supply battery power, which is subject to the battery protecting circuit 320, to the electronic device through another FPCB 340 and the battery connector 330. The battery protecting circuit 320 and the other FPCB 340 may connect the sensor device with the monitoring device by electrically connecting transmission and reception lines of the sensor device and the monitoring device with each other. The other FPCB 340 may be replaced with a wire.

Figure 7:
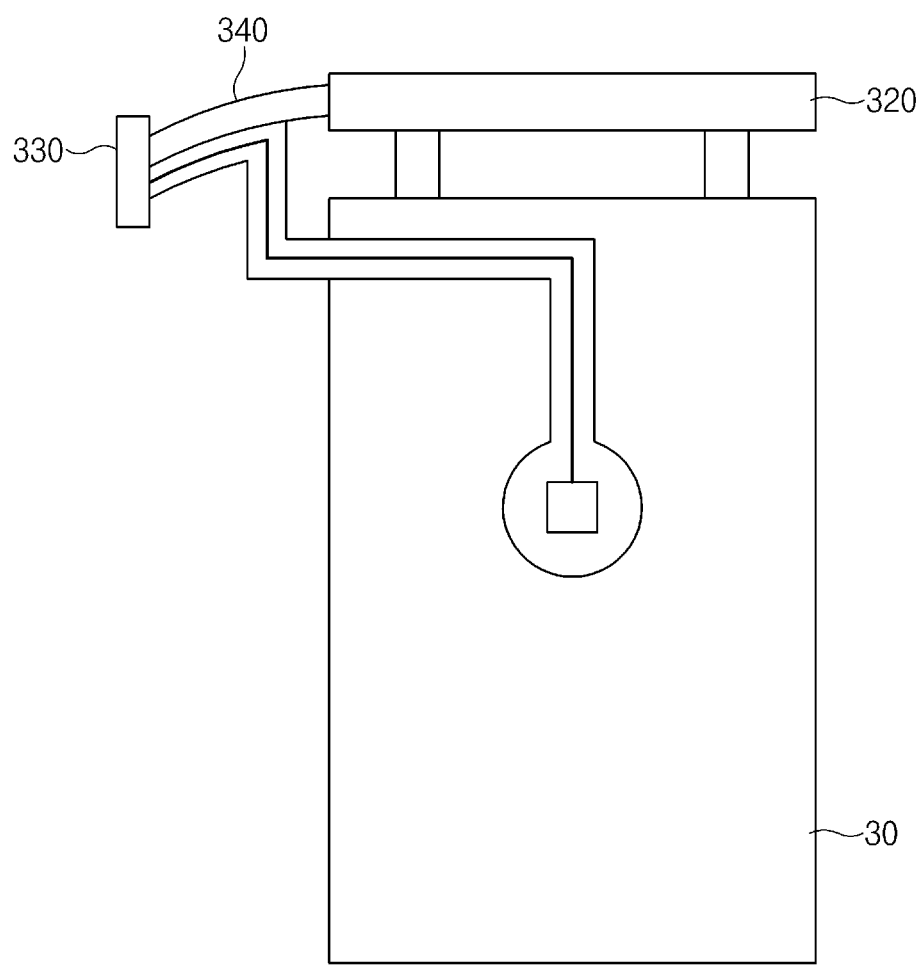
FIG. 7 is a view illustrating a sensor device, according to an embodiment.

FIG. 7 is a view illustrating the sensor device, according to an embodiment.

Referring to FIG. 7, according to an embodiment, the sensor device 10 (e.g., see reference numeral 10 of FIG. 1) may be connected with the electronic device (e.g., see reference numeral 60 of FIG. 4) through the other FPCB 340. The other FPCB 340 may be a substrate to electrically connect the battery protecting circuit 320 with the battery connector 330. For example, the other FPCB 340 may be configured in a Y shape. Accordingly, a first end of the other FPCB 340 may be electrically connected with the battery connector 330, a second end of the other FPCB 340 may be electrically connected with the battery protecting circuit 320, and a third end of the other FPCB 340 may be attached to one region of the battery 30. When the battery connector 330 is electrically connected with the electronic device, the sensor device and the monitoring device may be electrically connected with each other through the other FPCB 340. As described above, the sensor device may be attached to a packing material, such as an aluminum foil member, for wrapping a battery cell to more precisely detect a battery state.

Figure 8:
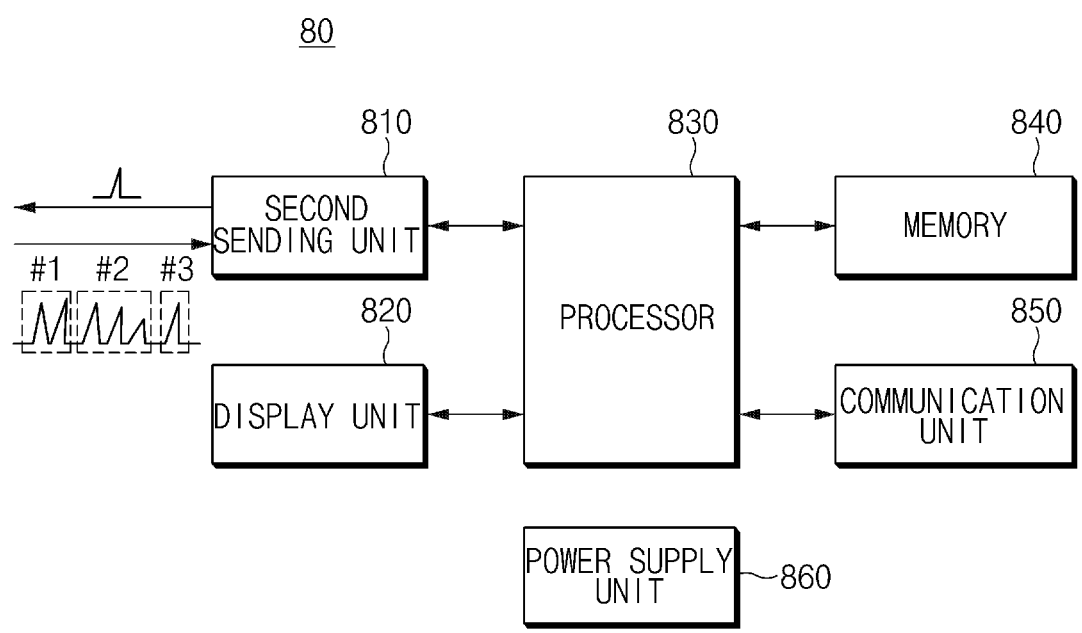
FIG. 8 is a block diagram illustrating a monitoring device, according to an embodiment.

FIG. 8 is a block diagram illustrating the monitoring device, according to an embodiment.

Referring to FIG. 8, the monitoring device 80 may include a power supply unit 860, a display unit 820, a memory 840, a communication unit 850, a second sending unit 810, and a processor 830. According to an embodiment, some elements may be omitted or additional elements may be added. Some of the elements may be combined with each other so as to form a single entity and the functions of the elements may be performed in the same manner as before the combination. The input/output relation illustrated in FIG. 8 is provided for the convenience of explanation, but the present disclosure is not limited thereto.

According to an embodiment, the power supply unit 860 may generate a driving voltage for each element of the monitoring device 80. The power from the power supply unit 860 may be transmitted to the sensor device (e.g., see reference numeral 10 of FIG. 1) through the second sending unit 810.

According to an embodiment, the display unit 820 may display the temperature of the battery, the pressure of the battery, or the electrolyte leakage state of the battery according to the instruction of the processor 830. The display unit 820 may be a display displaying a text, an icon, etc. The display unit 820 may include LEDs with different colors.

The memory 840 may include a volatile memory (e.g., a random access memory (RAM)), a non-volatile memory (e.g., a read only memory (ROM), a flash memory, etc.), or the combination thereof. The memory 840 may store a command or data related to at least one other element of the monitoring device 80. According to an embodiment, the memory 840 may store instructions for generating the first signal and reference data for detecting a battery state (e.g., temperature, pressure, or an electrolyte leakage) by using the variation of the second signal based on the first signal.

According to an embodiment, the second sending unit 810 may transmit the first signal from the processor 830 to the sensor device. The second sending unit 810 may be an antenna for propagating the first signal in a specified frequency band and for receiving a signal in a specified frequency band. The second sending unit 810 may be a connector or a contact electrically connected with the sensor device to transmit the first signal or to receive the second signal.

According to an embodiment, the processor 830 may transmit a first signal to the sensor device at a specified cycle. The first signal may be split through the transmission line of the sensor device and transmitted to a plurality of sensor units. The sensor of each sensor unit may generate an SAW and may output a second signal corresponding to the SAW varied depending on the battery state (e.g., temperature, pressure, or electrolyte leakage), when receiving the first signal. The second signals from the sensors may be received to the monitoring device 80 at different time points according to the delay characteristic of each sensor.

According to an embodiment, the processor 830 may determine a plurality of states of the temperature of the battery, the pressure of the battery, or the electrolyte leakage of the battery by analyzing the second signals from the sensor device. The processor 830 may determine a temperature variation state of the battery, the pressure variation state of the battery, and the electrolyte leakage state of the battery by determining the variation (e.g., in at least one of a phase shift and a frequency shift) of the received signal (e.g., second signal) compared with the transmitted signal (e.g., the first signal).

According to an embodiment, the processor 830 may determine, based on the reception sequence of the received second signals, the position and the type of a sensor, which has transmitted each of the received second signals, among the sensors. The processor 830 may time-divide a receive channel by the number (e.g., 3) of the sensor units and may distinguish between signals from the sensor units, by using the time-division sections. The monitoring device 80 may analyze a signal, which is received in a first section #1, as a signal in a first group, a signal, which is received in a second section #2, as a signal in a second group, and a signal, which is received in a third section #3, as a signal in a third group. The processor 830 may compare the transmitted signal with the signal received in each section and may determine the temperature, the pressure, or the electrolyte leakage by using the change (e.g., a frequency shift, a phase shift, etc.) between the transmitted signal and the received signal based on the comparison result.

According to an embodiment, the processor 830 may determine the battery to be in an abnormal state when the temperature of the battery is greater than or equal to a threshold temperature, when the pressure of the battery is greater than or equal to a threshold pressure, when the electrolyte of the battery is determined to leak. The processor 830 may determine the temperature of the battery by comparing the change in a signal, which responds to the first signal and is received from the temperature sensor, with reference data. When the determined temperature of the battery is greater than or equal to the threshold temperature, the processor 830 may determine the temperature of the battery to be abnormal. For another example, the processor 830 may determine the pressure of the battery by comparing a signal, which responds to the first signal and is received from the pressure sensor, with reference data. When the determined pressure of the battery is the threshold pressure or more based on the reference data, the processor 830 may determine the pressure of the battery to be abnormal (e.g., swelling occurs). The processor 830 may determine the electrolyte leakage by comparing a signal, which responds to the first signal and is received from the electrolyte sensor, with the reference data. The processor 830 may determine the electrolyte of the battery to be leaking, when the signal, which responds to the first signal and is received from the electrolyte sensor, is greater than or equal to a threshold variation or more based on the reference data.

According to an embodiment, the processor 830 may display, on the display unit 820, the analyzed temperature, pressure, and electrolyte leakage of the battery. The processor 830 may turn on LEDs allocated to the temperature, the pressure, and the electrolyte leakage of the battery, respectively, when detecting each of the temperature, the pressure, and the electrolyte leakage of the battery. The monitoring device 80 may display, on a display, the battery state in the form of a text, an icon, etc. The monitoring device 80 may inform, through a speaker, whether the battery is normal or not.

According to an embodiment, the processor 830 may restrict the charging for the battery when determining at least one of the abnormal temperature, the abnormal pressure, and the electrolyte leakage of the battery. The monitoring device 80 may transmit information that the battery is in an abnormal state to the electronic device having the battery through the communication unit 850, when determining at least one of the abnormal temperature, the abnormal pressure, and the electrolyte leakage of the battery. The electronic device may be a device driven using the battery power.

According to an embodiment, the communication unit 850 may support the communication between the processor 830 and the electronic device. The electronic device may be a device driven by using battery power to which the sensor device is applied. For example, the communication unit 850 may communicate with an electronic device through communication manners such as WiFi, long-term evolution (LTE), Bluetooth, or NFC.

Figure 9:
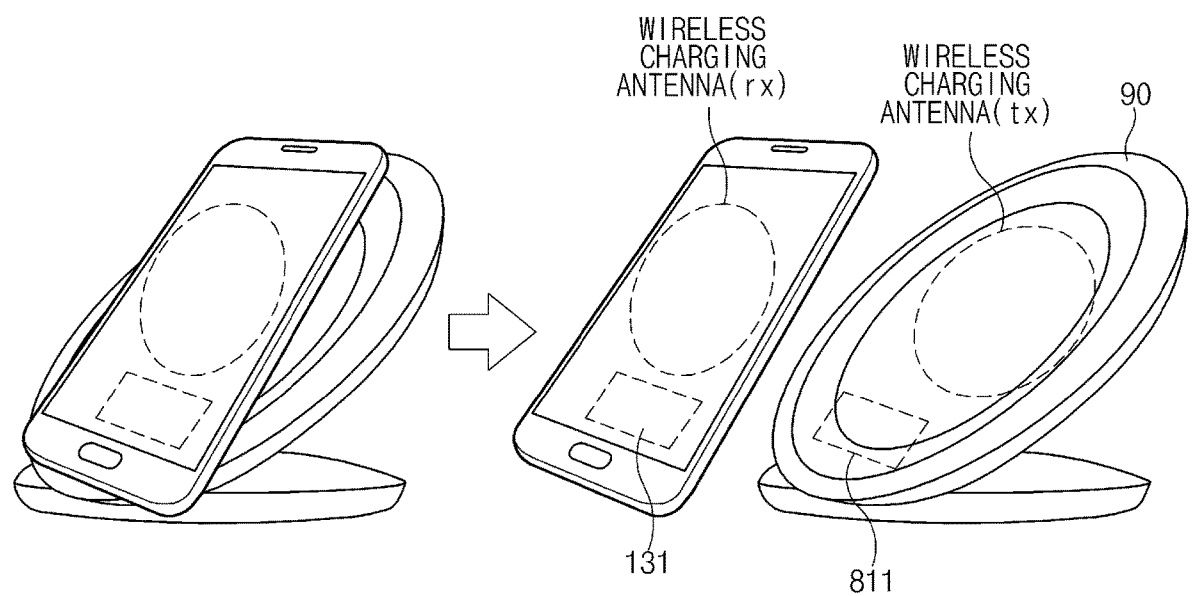
FIG. 9 is a view illustrating a monitoring device, according to an embodiment.

FIG. 9 is a view illustrating the monitoring device, according to an embodiment. Referring to FIG. 9, when the monitoring device (e.g., see reference numeral 80 of FIG. 1) is applied to the wireless charger 90, the sensor device may wirelessly communicate with the monitoring device. In this case, the antenna of the sensor device and the antenna of the monitoring device may be provided in such a manner that the antennas do not affect the power transmission or reception between the monitoring device and the battery. The antenna 811 and the antenna 131 of the sensor device and the monitoring device may be provided to be spaced apart from the wireless charging antenna by a predetermined distance.

Figure 10:
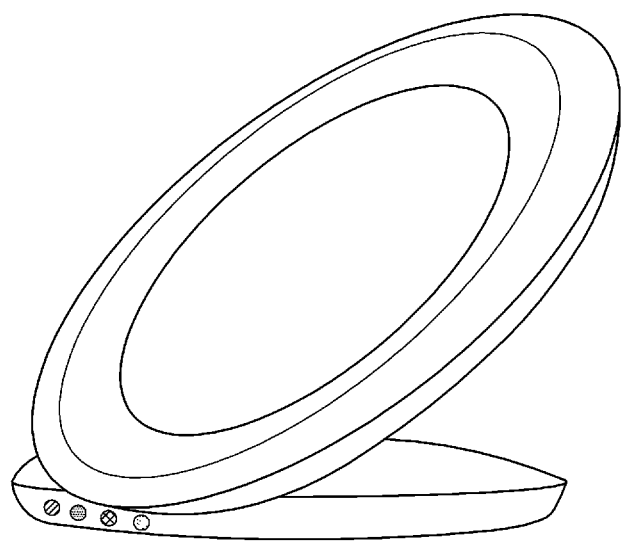
FIG. 10 is a view illustrating a display unit of a monitoring device, according to an embodiment.

FIG. 10 is a view illustrating a display unit of a monitoring device, according to a first embodiment. FIG. 10 illustrates the case that the monitoring device 80 is a wireless charger.

Referring to FIG. 10, the monitoring device may include a plurality of LEDs, may warn about the abnormal temperature, the abnormal pressure, and the electrolyte leakage of the battery by using a first LED 1010, a second LED 1020, a third LED 1030, and a fourth LED 1040, and may inform that the electronic device should be brought to the service center. The LEDs may be configured in colors varied depending on, for example, the warning or the notification content. The monitoring device 80 may determine and warn that the battery is in an abnormal state by comparing values sensed by the sensors with a plurality of threshold values.

According to an embodiment, the monitoring device may display the battery state depending on at least one of the determined battery temperature or the number of sensors detecting that the temperature of the battery is greater than or equal to than the threshold temperature. The monitoring device may turn on a first LED 1010 for warning about the abnormal temperature of the battery and a fourth LED 1040 for notifying that the electronic device should be brought to the service center, when at least one of temperature sensors senses at least the threshold temperature (e.g., 55° C.). The monitoring device 80 may turn on the first LED 1010 and the fourth LED 1040 warning that the temperature of the battery is abnormal, when the number of sensors, which sense the temperature less than a first threshold temperature and greater than or equal to a second threshold temperature (e.g., 45° C.), is a greater than or equal to a threshold number (e.g., a majority of the sensors). For another example, the monitoring device 80 may turn on the first LED 1010 warning that the temperature of the battery is abnormal without turning on the fourth LED 1040 when the number of temperature sensors, which sense the temperature is less than a first threshold temperature and greater than or equal to a second threshold temperature, is a threshold number.

According to an embodiment, the monitoring device 80 may display the battery state depending on at least one of the determined battery pressure and the number of sensors sensing that the pressure of the battery is greater than or equal to the threshold pressure. The monitoring device 80 may turn on the second LED 1020 warning that the pressure of the battery is abnormal and the fourth LED 1040 notifying that the electronic device should be brought to the service center, when at least one of the pressure sensors senses pressure greater than or equal to a first threshold level. The monitoring device 80 may turn on the second LED 1020 and the fourth LED 1040 when the majority of the pressure sensors sense pressure ranging from less than the first threshold level to at least the second threshold level. The monitoring device may turn on the second LED 1020 and the fourth LED 1040, when less than the majority of the pressure sensors senses the pressure ranging from less than the first threshold level to at least the second threshold level.

According to an embodiment, the monitoring device may warn about the electrolyte leakage, when one electrolyte sensor senses the electrolyte leakage. The monitoring device 80 may turn on the second LED 1030 warning about the electrolyte leakage and the fourth LED 1040 notifying that the electronic device should be brought to the service center, when at least one electrolyte sensor senses the electrolyte leakage.

According to an embodiment, the monitoring device may include LEDs corresponding to the number of the sensor units provided in the sensor device. The monitoring device may include 21 LEDs for indicating sensing results (e.g., an abnormal state) by a temperature sensor, a pressure sensor, and an electrolyte sensor, which is provided in each sensor unit, and at least one LED for notifying that the electronic device should be brought to the service center.

Figure 11:
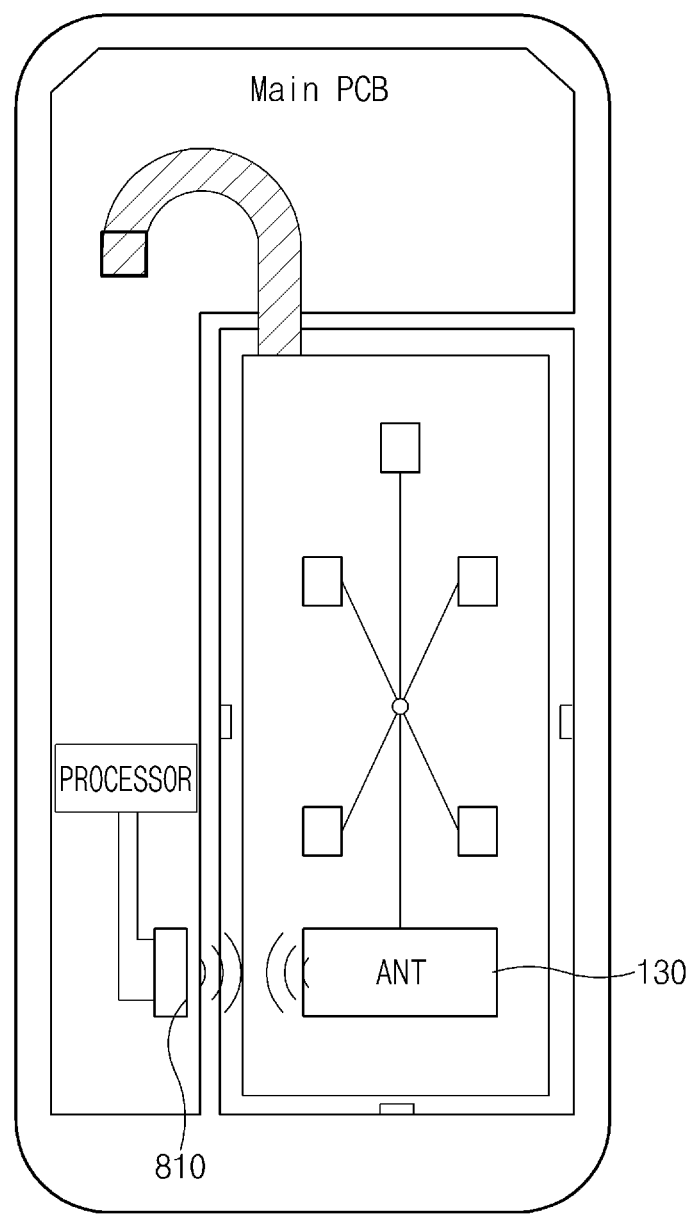
FIG. 11 is a view illustrating a monitoring device, according to an embodiment.

FIG. 11 is a view illustrating the monitoring device, according to an embodiment.

Referring to FIG. 11, the monitoring device is provided in the main board of the electronic device and may wirelessly communicate with the sensor device. In this case, all elements of the monitoring device may be provided on the main board and the first sending unit 130 and second sending unit 810 may be connected to the first and third antennas provided adjacent to each other.

According to an embodiment, the first and third antennas may be provided in such a manner that the first and third antennas have relative less effect on another function of the electronic device and improve communication performance. The first to third antennas may have orientations in directions facing each other, for example, side directions.

Figure 12:
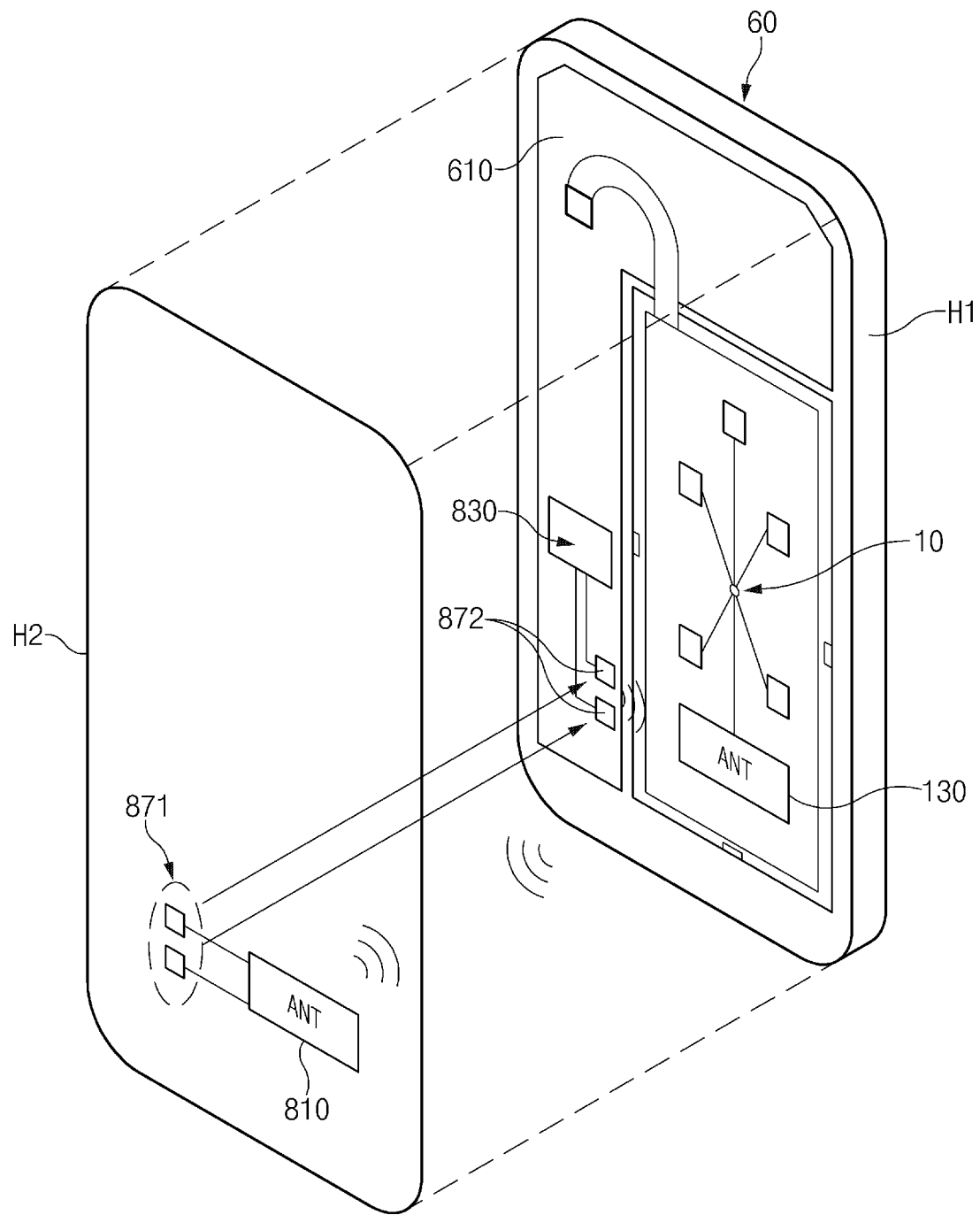
FIG. 12 is a view illustrating a monitoring device, according to an embodiment.

FIG. 12 is a view illustrating the monitoring device, according to an embodiment. Referring to FIG. 12, the monitoring device may be provided in the main board 610 and a rear housing H2 of the electronic device 60. The second sending unit 810 may be fixed onto an inner surface of the rear housing H2 and another element of the monitoring device may be provided in the main board 610 of the electronic device 60.

According to an embodiment, the second sending unit 810 may include the antenna to communicate with the sensor device and a first contact terminal 871 and a second contact terminal 872 to connect the antenna with the processor 830. At least one first contact terminal 871 of the antenna may be provided in the rear housing H2 and at least one second contact terminal 872 may be provided in the main board 610.

The antenna and the at least one first contact terminal 871 may be fixed to the rear housing H2 by using another member. The antenna and the at least one first contact terminal 871 may be mounted on a FPCB and may be fixed to the rear housing H2 as the FPCB is attached to the rear housing H2 by using an adhesive or a hook. The at least one first contact terminal 871 may be integrated with the antenna. At least one first contact terminal 871 may be a contact terminal of the antenna. According to an embodiment, the second contact terminal 872 may be soldered to the main board 610.

According to an embodiment, as the first contact terminal 871 and second contact terminal 872 are configured in positions, sizes, and shapes corresponding to each other, the first contact terminal 871 and the second contact terminal 872 may be electrically connected with each other when the rear housing H2 is assembled with the side housing H1. Therefore, the second sending unit 810 may be electrically connected with the processor 830. One of at least one first contact terminal 871 and the at least one second contact terminal 872 may have a convex shape, and a remaining one of the at least one first contact terminal 871 and the at least one second contact terminal 872 may have a concave shape. Therefore, when the rear housing H2 is assembled with the side housing H1, the first contact terminal 871 and the second contact terminal 872 are engaged with each other and electrically connected with each other. At least one second contact terminal 872 may be, for example, a pad formed on the main board 610 and the first contact terminal 871 has a protrusion shape. Therefore, when the rear housing H2 is assembled with the side housing H1, the first contact terminal 871 and the second contact terminal 872 may be electrically connected with each other.

According to an embodiment, the first sending unit 130 may be an antenna provided on an FPCB of the sensor device 10. The first sending unit 130 and the second sending unit 810 may be directional antennas which has relative less effect on another function of the electronic device 60 and improve communication performance. For example, the first sending unit 130 and the second sending unit 810 may be antennas having directionalities in directions opposite to the mounting surface.

Although the above embodiments have been described regarding the case that the monitoring device wirelessly communicates with the sensor device, the monitoring device 80 may communicate with the sensor device 10 in a wired manner.

Figure 13:
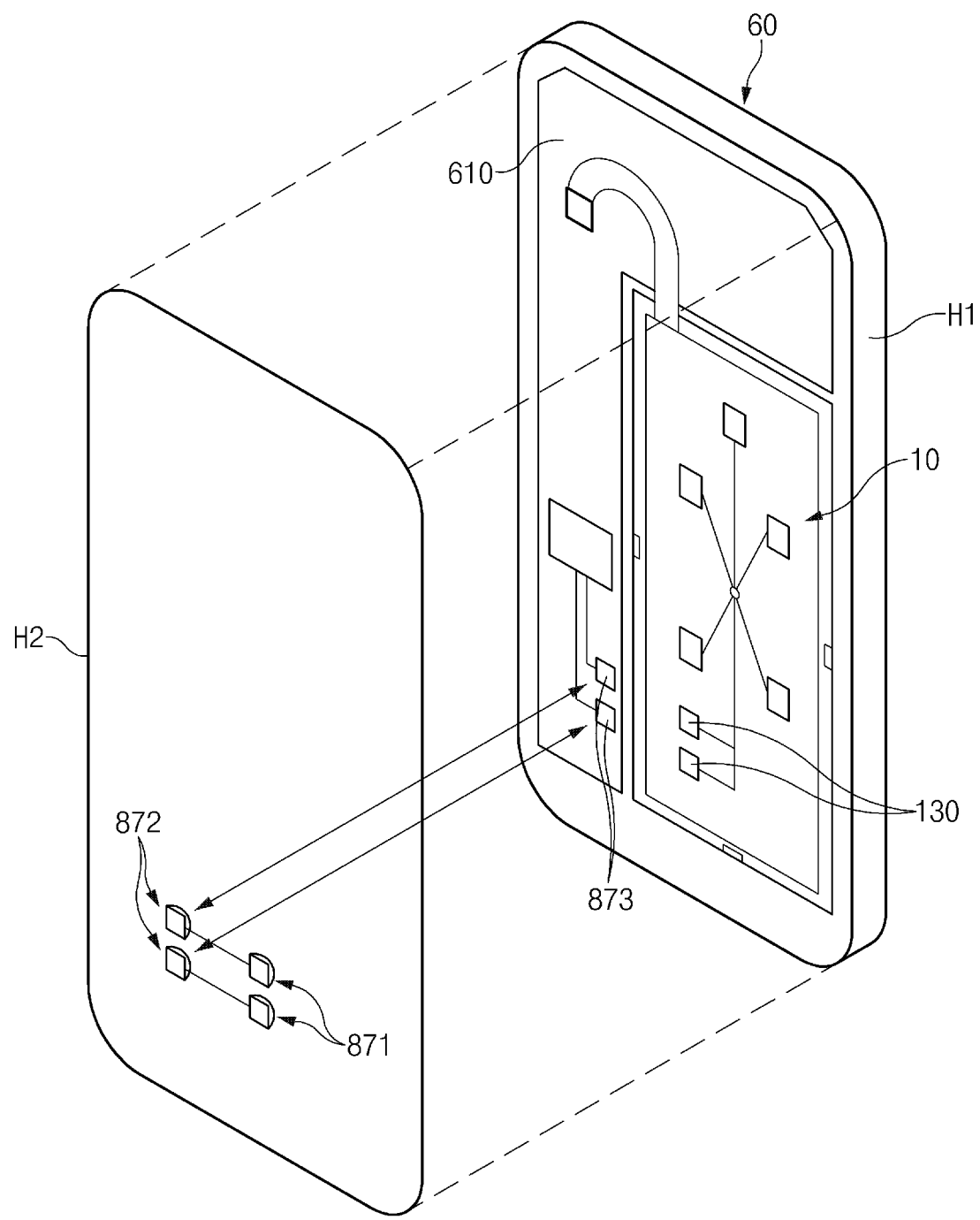
FIG. 13 is a view illustrating a monitoring device, according to an embodiment.

FIG. 13 is a view illustrating the monitoring device, according to an embodiment. Referring to FIG. 13, the monitoring device may be provided in the main board 610 and the rear housing H2 of the electronic device 60 and may be connected with the sensor device 10 in a wired manner. According to an embodiment, the first sending unit 130 may be at least one pad provided on the FPCB of the sensor device 10. In addition, the first sending unit 130 may be a protrusion-type device provided in the FPCB of the sensor device 10.

According to an embodiment, the second sending unit 810 may include a first contact terminal 871 and a second contact terminal 872 provided on the rear housing H2 and a third contact terminal 873 provided on the main body 610. The second sending unit 810 may be electrically connected with the first sending unit 130 as the rear housing H2 is assembled with the side housing H1.

According to an embodiment, the first contact terminal 871, the second contact terminal 872, and the third contact terminal 873 may have shapes, positions, and sizes which are able to be coupled to each other when the rear housing H2 is assembled with the side housing H1. The first contact terminal 871 and the second contact terminal 872 are formed integrally with each other and configured in a substantially C shape corresponding to the spacing between the rear housing H2 and the side housing H1. The third contact terminal 873 may be a pad formed on the main board 610. When the rear housing H2 is assembled with the side housing H1 where both ends of the first contact terminal 871 protrude, both ends of the first contact terminal 871 may make contact with a pad provided in the main board 610 and a pad provided in the sensor device 10, respectively, and middle portions of the first contact terminal 871 and the second contact terminal 872 may be fixed to the rear housing H2. One of the first contact terminal 871 and the first sending unit 130 may have a convex shape and a remaining one of the first contact terminal 871 and the first sending unit 130 has a concave shape. Therefore, when the rear housing H2 is assembled with the side housing H1, the second contact terminal 872 and the third contact terminal 873 are engaged with each other and electrically connected with each other. Similarly, one of the second contact terminal 872 and the third contact terminal 873 has a convex shape and a remaining one of the second contact terminal 872 and the third contact terminal 873 may have a concave shape. Therefore, when the rear housing H2 is assembled with the side housing H1, the second contact terminal 872 and the third contact terminal 873 are engaged with each other and electrically connected with each other.

According to an embodiment, the electronic device 60 may include the battery having the sensor device 10 attached thereto. The sensor device 10 may generate a SAW corresponding to the received first signal and output a plurality of second signals corresponding to SAWs varied depending on a plurality of states of the temperature, the pressure, and the electrolyte leakage of the battery; and a monitoring device which transmits the first signal, which is used to generate the SAW, to the sensor device 10, receives the second signals from the sensor device 10, and determines the states of the battery by analyzing the second signals.

According to an embodiment, a charging device may include a sensor device 10, which is attached to a battery, generate a SAW corresponding to a received first signal, and output a plurality of second signals corresponding to SAWs varied depending on a plurality of states of the temperature, the pressure, and the electrolyte of the battery; a monitoring device which transmits the first signal, which is used to generate the SAW, to the sensor device 10, receives the second signals from the sensor device 10, and determines the states of the battery by analyzing the second signals; and a charging circuit which supplies charging power to the battery.

Figure 14:
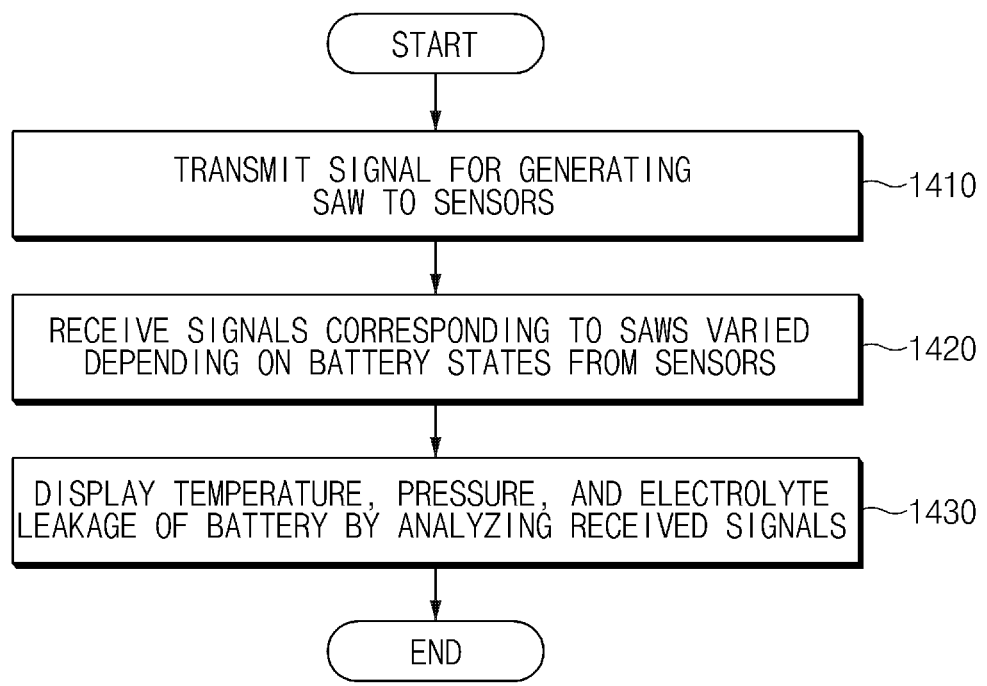
FIG. 14 is a flowchart illustrating a battery monitoring method, according to an embodiment.

FIG. 14 is a flowchart illustrating a battery monitoring method, according to an embodiment.

Referring to FIG. 14, in step 1410, the monitoring device (e.g., see reference numeral 80 of FIG. 1) may transmit a first signal for generating an SAW to be varied depending on a plurality of battery states among a temperature state, a pressure state, and an electrolyte leakage to the sensor device.

In step 1420, the monitoring device may receive a plurality of second signals corresponding to SAWs varied depending on the battery states from the sensor device.

In step 1430, the monitoring device may output information corresponding to the state of the battery by analyzing the received second signals.

According to an embodiment, the battery device (e.g., see reference numeral 10 of FIG. 3) includes at least one battery (e.g., see reference numeral 30 of FIG. 3); a plurality of sensors (e.g., see reference numeral 110 of FIG. 3) attached to the battery; and a transceiving circuit (e.g., see reference numeral 120, 131 of FIG. 3) configured to transmit a signal received from a monitoring device to the sensors and to transmit signals received from the sensors to the monitoring device. The sensors generate SAWs in response to the signal received from the monitoring device, when receiving the signal from the monitoring device through the transceiving circuit. The sensors include a plurality of sensors of at least one first sensor configured to output a first signal corresponding to a SAW varied depending on a temperature of the battery; at least one second sensor configured to output a second signal corresponding to a SAW varied depending on pressure of the battery; and at least one third sensor configured to output a third signal corresponding to a SAW varied depending on an electrolyte leakage state of the battery.

The sensors may include delay lines configured to delay the received signals to different times.

The at least one first sensor may be attached to a position which allows the at least one first sensor to sense the temperature of the battery; the at least one second sensor is attached to a position which allows the at least one second sensor to sense the pressure of the battery; and the at least one third sensor is attached to a position which allows the at least one third sensor to sense the electrolyte leakage of the battery.

The sensors may be attached to the battery by using a thermal conductive material.

The transceiving circuit may include a transmission line configured to split the signal from the monitoring device at one node and transmit split signals to the sensors.

The transceiving circuit may include an antenna configured to propagate the signals received from the sensors in a specified frequency band.

The transceiving circuit may include a connector electrically connected with the monitoring device and configured to transmit the signals received from the sensors to the monitoring device.

According to an embodiment, a battery monitoring system (e.g., see reference numeral 1800 of FIG. 1) includes a sensor device attached to a battery (e.g., see reference numeral 10 of FIG. 1), configured to generate a SAW corresponding to a first signal received in the sensor device, and configured to output a plurality of second signals corresponding to SAWs varied depending on a plurality of states of a temperature of the battery, pressure of the battery, and an electrolyte leakage of the battery, respectively; and a monitoring device (e.g., see reference numeral 80 of FIG. 1) configured to transmit the first signal, which is used to generate the SAW, to the sensor device, to receive the second signals from the sensor device, and to identify the states of the battery by analyzing the second signals.

The monitoring device may be configured to distinguish a response signal for indicating a temperature variation of the battery, a response signal for indicating a pressure variation of the battery, and a response signal for indicating an electrolyte leakage state among the second signals, based on a sequence of receiving the second signals.

The monitoring device may identify a plurality of states of a temperature variation state of the battery, a pressure variation state of the battery, and an electrolyte leakage state of the battery by identifying at least one of phase shifts and frequency shifts of the second signals based on the first signal.

The monitoring device restricts charging for the battery, when at least one of the temperature of the battery and the pressure of the battery is greater than or equal to a specified reference value or when the electrolyte leakage of the battery is sensed, based on a result obtained by analyzing at least one of the response signals.

The monitoring device transmits, to an electronic device driven using power of the battery, information for notifying that the battery is in an abnormal state, when at least one of the temperature of the battery and the pressure of the battery is greater than or equal to a specified reference value or when the electrolyte leakage of the battery is sensed, based on a result obtained by analyzing at least one of the response signals.

According to an embodiment, the battery monitoring system may include an output unit configured to output a result obtained by analyzing at least one of the second signals.

The sensor device may include a first antenna (e.g., see reference numeral 131 of FIG. 11); the monitoring device includes a second antenna (e.g., see reference numeral 810 of FIG. 11); and the monitoring device transmits the first signal to the sensor device and receives the second signals from the sensor device, through the first and second antennas.

The sensor device and the monitoring device are electrically connected with each other through an interface (e.g., see reference numeral 330 of FIG. 7) for outputting power of the battery.

The sensor device and the monitoring device may be electrically connected with each other by using a mechanical contact (e.g., see reference numeral 871, 872 and 873 of FIG. 13) fixed to a housing of an electronic device.

A battery monitoring method by at least one processor, the battery monitoring method includes transmitting a first signal to a plurality of sensors attached to a battery; receiving a plurality of second signals corresponding to SAWs which are differently generated, based on the transmitted first signal, depending on a plurality of states of a temperature state of the battery, a pressure state of the battery, and an electrolyte leakage state of the battery; and outputting information corresponding to a plurality of states of a temperature, pressure, and an electrolyte leakage of the battery by analyzing the second signals.

The outputting of the information may include distinguishing signals corresponding to the temperature, the pressure, and the electrolyte leakage of the battery, respectively, among the second signals, based on a sequence of receiving the second signals.

The outputting of the information may include identifying a plurality of states of a temperature variation state of the battery, a pressure variation state of the battery, and the electrolyte leakage state of the battery, based on at least one of phase shifts and frequency shifts of the second signals based on the first signal.

The battery monitoring method may include restricting charging for the battery, when at least one of the temperature of the battery and the pressure of the battery is greater than or equal to a specified reference value or when the electrolyte leakage of the battery is sensed, based on a result obtained by analyzing at least one of the second signals.

Figure 15:
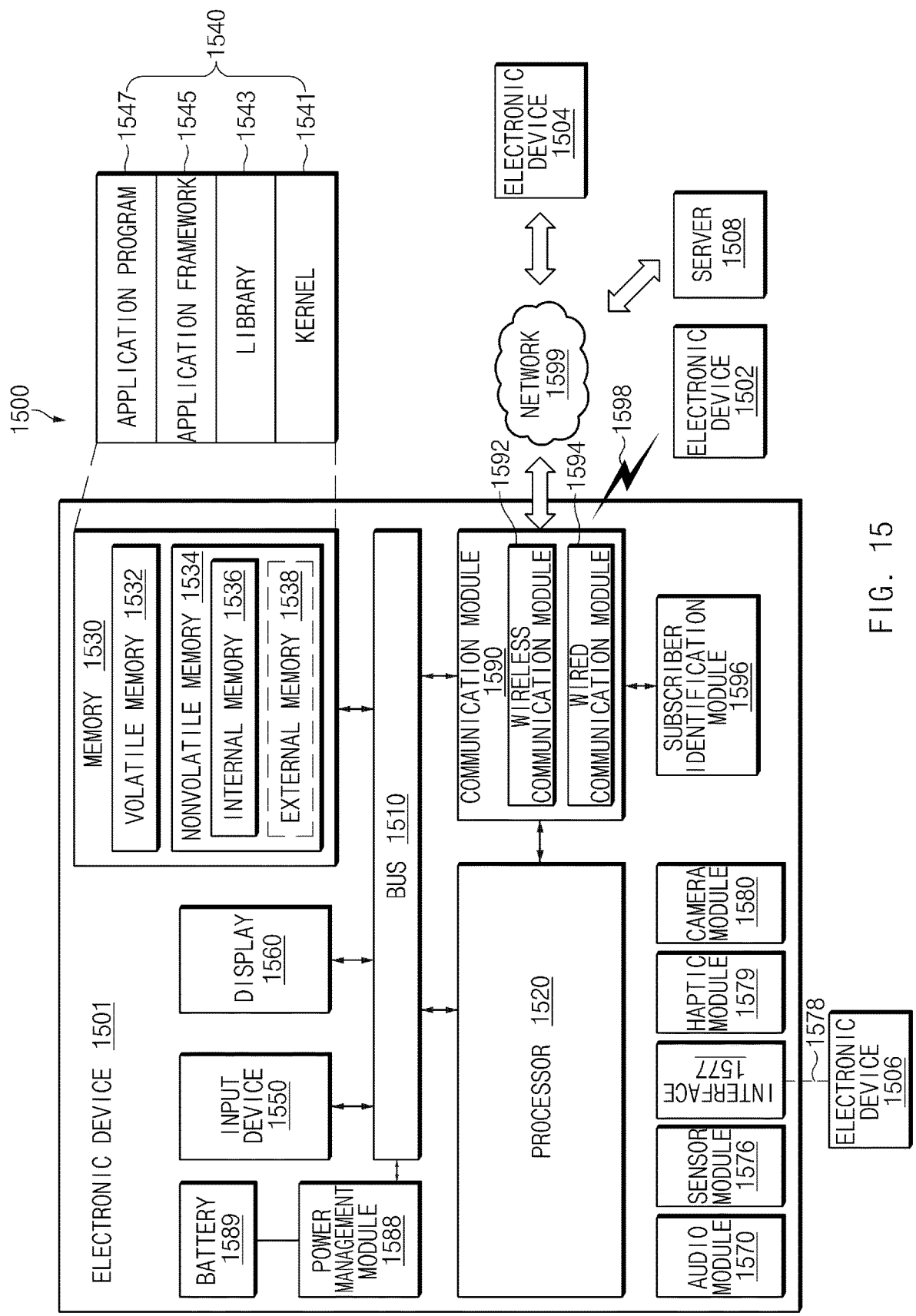
FIG. 15 is a block diagram of an electronic device for monitoring the battery device in a network environment according to an embodiment.

FIG. 15 is a block diagram of an electronic device for monitoring the battery device in a network environment according to an embodiment.

FIG. 15 illustrates an electronic device 1501 (e.g., see reference numeral 60 of FIG. 6) in a network environment 1500, according to an embodiment. According to an embodiment, the electronic device 1501 may include various types of devices. For example, the electronic device 1501 may include at least one of a portable communication device (e.g., smartphones), a computer device (e.g., a personal digital assistant (PDA), a tablet personal computers (PC), a laptop PC, a desktop PC, a workstation, or a server), a portable multimedia device (e.g., an e-book reader or an motion picture experts group (MPEG-1 or MPEG-2) audio layer 3(MP3) player), a portable medical device (e.g., a heart rate measuring device, a blood glucose level device, a blood pressure monitor device, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. The electronic device may include at least one of, for example, televisions (TVs), digital versatile disc (DVD) players, audio players, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (IoT) device (e.g., a light bulb, a sprinkler device, a fire alarm, a thermostat, or a street lamp). The electronic device is not limited to the above-described devices. For example, similarly to a smartphone having a function of measuring personal bio-information (e.g., a heart rate or blood glucose level), the electronic device may provide functions of multiple devices. In the present disclosure, the term "user" may refer to a person who uses the electronic device or may refer to a device (e.g., an artificial intelligence (AI) electronic device) that uses the electronic device.

Referring to FIG. 15, under the network environment 1500, the electronic device 1501 may communicate with an electronic device 1502 through first network 1598 or may communication with an electronic device 1504 or a server 1508 through a network a second network 1599. According an embodiment, the electronic device 1501 may communicate with the electronic device 1504 through the server 1508.

According to an embodiment, the electronic device 1501 may include a bus 1510, at least one processor 1520 (e.g., see reference numeral 830 of FIG. 12), a memory 1530, an input device 1550 (e.g., a micro-phone or a mouse), a display 1560, an audio module 1570, a sensor module 1576, an interface 1577, a haptic module 1579, a camera module 1580, a power management module 1588, a battery 1589 (e.g., see reference numeral 30 of FIG. 3), a communication module 1590, and a subscriber identification module (SIM) 1596. The electronic device 1501 may not include at least one (e.g., the display 1560 or the camera module 1580) of the above-described elements or may further include other element(s).

The bus 1510 may interconnect the above-described elements 1520 to 1590 and may include a circuit for conveying signals (e.g., a control message or data) between the above-described elements. The processor 1520 may include one or more of a CPU, an AP, a graphic processing unit (GPU), a camera image signal processor (ISP) of a camera or a CP. According to an embodiment, the processor 1520 may be implemented with a system on chip (SoC) or a system in package (SiP). The processor 1520 may drive an operating system (OS) or an application to control at least one of other element (e.g., hardware or software element) connected to the processor 1520 and may process and compute various data. The processor 1520 may load an instruction or data, which is received from at least one of other elements (e.g., the communication module 1590), into a volatile memory 1532 to process the instruction or data and may store the process result data into the nonvolatile memory 1534.

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor (e.g., a CPU or an AP), and an auxiliary processor (e.g., a GPU, an ISP, a sensor hub processor, or a CP) that is operable independently from, or in conjunction with, the main processor. Additionally or alternatively, the auxiliary processor may be adapted to consume less power than the main processor, or to be specific to a specified function. The auxiliary processor may be implemented as separate from, or as part of the main processor.

The memory 1530 may include, for example, a volatile memory 1532 or a nonvolatile memory 1534. The volatile memory 1532 may include, for example, a RAM (e.g., a dynamic random access memory (DRAM), a static RAM (SRAM), or a synchronous dynamic RAM (SDRAM)). The nonvolatile memory 1534 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 1534 may be configured in the form of an internal memory 1536 or the form of an external memory 1538 which is available through connection only if necessary, according to the connection forms of the electronic device 1501. The external memory 1538 may further include a flash drive such as compact flash (CF), secure digital (SD), micro secure digital (micro-SD), mini secure digital (mini-SD), extreme digital (xD), a multimedia card (MMC), or a memory stick. The external memory 1538 may be operatively or physically connected with the electronic device 1501 in a wired manner (e.g., a cable or a universal serial bus (USB)) or a wireless (e.g., Bluetooth (BT)) manner.

The memory 1530 may store, for example, at least one different software element, such as an instruction or data associated with the program 1540, of the electronic device 1501. The program 1540 may include, for example, a kernel 1541, a library 1543, an application framework 1545 or an application 1547.

The input device 1550 may include a microphone, a mouse, or a keyboard. According to an embodiment, the keyboard may include a keyboard physically connected or a keyboard virtually displayed through the display 1560.

The display 1560 may include a display, a hologram device or a projector, and a control circuit to control a relevant device. The screen may include, for example, a liquid crystal display (LCD), an LED display, an organic LED (OLED) display, a plastic OLED (POLED), a microelectromechanical systems (MEMS) display, or an electronic paper display. According to an embodiment, the display may be a flexible, transparent, or wearable display. The display may include a touch circuitry, which is able to detect a user's touch input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1501.

The audio module 1570 may convert, for example, from a sound into an electrical signal or from an electrical signal into the sound. According to an embodiment, the audio module 1570 may acquire sound through the input device 1550 (e.g., a microphone) or may output sound through an output device (e.g., a speaker or a receiver) included in the electronic device 1501, an external electronic device (e.g., the electronic device 1502 (e.g., a wireless speaker or a wireless headphone)) or an electronic device 1506 (e.g., a wired speaker or a wired headphone) connected with the electronic device 1501

The sensor module 1576 may measure or detect, for example, an internal operating state (e.g., power or temperature) or an external environment state (e.g., an altitude, a humidity, or a brightness) of the electronic device 1501 to generate an electrical signal or a data value corresponding to the information of the measured state or the detected state. The sensor module 1576 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor. The sensor module 1576 may further include a control circuit for controlling at least one or more sensors included therein. According to an embodiment, the sensor module 1576 may be controlled by using the processor 1520 or a processor (e.g., a sensor hub) separate from the processor 1520. In the case that the separate processor (e.g., a sensor hub) is used, while the processor 1520 is a sleep state, the separate processor may operate without awakening the processor 1520 to control at least a portion of the operation or the state of the sensor module 1576.

According to an embodiment, the interface 1577 may include a high definition multimedia interface (HDMI), an USB, an optical interface, a recommended standard 232 (RS-232), a D-subminiature (D-sub), a mobile high-definition link (MHL) interface, a SD card/MMC (multi-media card) interface, or an audio interface. A connector 1578 may physically connect the electronic device 1501 and the electronic device 1506. The connector 1578 may include, for example, an USB connector, an SD card/MMC connector, or an audio connector (e.g., a headphone connector).

The haptic module 1579 may convert an electrical signal into mechanical stimulation (e.g., vibration or motion) or into electrical stimulation. For example, the haptic module 1579 may apply tactile or kinesthetic stimulation to a user. The haptic module 1579 may include, for example, a motor, a piezoelectric element, or an electric stimulator.

The camera module 1580 may capture, for example, a still image and a moving picture. According to an embodiment, the camera module 1580 may include at least one lens (e.g., a wide-angle lens and a telephoto lens, or a front lens and a rear lens), an image sensor, an ISP, or a flash (e.g., a light emitting diode or a xenon lamp).

The power management module 1588, which is to manage the power of the electronic device 1501, may constitute at least a portion of a power management integrated circuit (PMIC).

The battery 1589 may include a primary cell, a secondary cell, or a fuel cell and may be recharged by an external power source to supply power to at least one element of the electronic device 1501.

The communication module 1590 may establish a communication channel between the electronic device 1501 and an external device (e.g., the first external electronic device 1502, the second external electronic device 1504, or the server 1508). The communication module 1590 may support wired communication or wireless communication through the established communication channel According to an embodiment, the communication module 1590 may include a wireless communication module 1592 or a wired communication module 1594. The communication module 1590 may communicate with the external device (e.g., the first external electronic device 1502, the second external electronic device 1504 or the server 1508) through a first network 1598 (e.g. a wireless local area network (LAN) such as Bluetooth or Infrared Data Association (IrDA)) or the second network 1599 (e.g., a wireless wide area network such as a cellular network) through a relevant module among the wireless communication module 1592 or the wired communication module 1594.

The wireless communication module 1592 may support, for example, cellular communication, local wireless communication, GNSS communication. The cellular communication may include, for example, LTE, LTE advance (LTE-A), code division multiple access (CDMA), wideband CDMA (WCDMA), universal mobile telecommunications system (UMTS), wireless broadband (WiBro), or global system for mobile communications (GSM). The local wireless communication may include Wi-Fi, WiFi Direct, light fidelity, Bluetooth, Bluetooth low energy (BLE), Zigbee, NFC, MST, radio frequency (RF), or a body area network (BAN). The GNSS may include at least one of a global positioning system (GPS), a global navigation satellite system (Glonass), Beidou navigation satellite system (Beidou) or Galileo, the European global satellite-based navigation system, etc. In the present disclosure, "GPS" and "GNSS" may be interchangeably used.

According to an embodiment, when the wireless communication module 1592 supports cellular communication, the wireless communication module 1592 may, for example, identify or authenticate the electronic device 1501 within a communication network using the SIM 1596 (e.g., a SIM card). The wireless communication module 1592 may include the processor 1520 (e.g., an AP and a separate CP. In this case, the communication processor may perform at least a portion of functions associated with at least one of elements 1510 to 1596 of the electronic device 1501 in substitute for the processor 1520 when the processor 1520 is in an inactive (e.g., sleep) state, and together with the processor 1520 when the processor 1520 is in an active state. The wireless communication module 1592 may include a plurality of communication modules, each supporting only a relevant communication scheme among cellular communication, short-range wireless communication, or a GNSS communication scheme.

The wired communication module 1594 may include, for example, include a local area network (LAN) service, a power line communication, or a plain old telephone service (POTS).

The first network 1598 may employ, for example, Wi-Fi direct or Bluetooth for transmitting or receiving instructions or data through wireless direct connection between the electronic device 1501 and the first external electronic device 1502. The second network 1599 may include a telecommunication network (e.g., a computer network such as a LAN or a wide area network (WAN), the Internet, or a telephone network) for transmitting or receiving instructions or data between the electronic device 1501 and the second electronic device 1504.

According to embodiments, the instructions or the data may be transmitted or received between the electronic device 1501 and the second external electronic device 1504 through the server 1508 connected with the second network. Each of the external first and second external electronic devices 1502 and 1504 may be a device of which the type is different from or the same as that of the electronic device 1501. All or a part of operations that the electronic device 1501 will perform may be executed by another or a plurality of electronic devices (e.g., the electronic devices 1502 and 1504, or the server 1508. In the case that the electronic device 1501 executes any function or service automatically or in response to a request, the electronic device 1501 may not perform the function or the service internally, but may alternatively or additionally transmit requests for at least a part of a function associated with the electronic device 1501 to another device. The other electronic device may execute the requested function or additional function and may transmit the execution result to the electronic device 1501. The electronic device 1501 may provide the requested function or service using the received result or may additionally process the received result to provide the requested function or service. To this end, cloud computing, distributed computing, or client-server computing may be used.

The term "module" as used in the present disclosure may represent, for example, a unit including one or more combinations of hardware, software and firmware. The term "module" may be interchangeably used with the terms "unit", "logic", "logical block", "component", and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 1520, may cause the one or more processors to perform a function corresponding to the instruction. The computer-readable storage media, for example, may be the memory 1530.

A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and hardware devices (e.g., a ROM, a RAM, or a flash memory). Also, a program instruction may include not only assembly code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A battery device comprising:
a battery;

a flexible printed circuit board (FPCB) attached to the battery;

a plurality of sensors mounted on the FPCB; and a transceiving circuit configured to transmit a signal received from a monitoring device to the plurality of sensors and to transmit signals received from the plurality of sensors to the monitoring device, wherein the FPCB includes an insulator layer, a ferrite, and a bonding layer, wherein the bonding layer bonds the FPCB onto an outer surface of the battery, and the ferrite is layered between the bonding layer and the insulator layer and prevents the signals from affecting the battery, wherein the plurality of sensors generate surface acoustic waves (SAWs) in response to the signal received from the monitoring device, when receiving the signal from the monitoring device through the transceiving circuit, wherein the plurality of sensors include:
  at least one first sensor configured to output a first signal corresponding to a SAW varied depending on a temperature of the battery,
  at least one second sensor configured to output a second signal corresponding to a SAW varied depending on pressure of the battery,
  at least one third sensor configured to output a third signal corresponding to a SAW varied depending on an electrolyte leakage state of the battery,
  at least one delay line configured to delay the received signals to different times, and
  a piezoelectric substrate, wherein the at least one second sensor is provided at a center of at least one of a top surface, a bottom surface, or a side surface of the battery, wherein the at least one third sensor is provided at a region adjacent to a terminal of the battery, wherein the temperature of the battery, the pressure of the battery, or the electrolyte leakage state of the battery expands or contracts the at least one delay line, wherein the piezoelectric substrate changes a SAW signal based on the expansion or contraction of the at least one delay line, and wherein the transceiving circuit includes a transmission line configured to split the signal from the monitoring device at one node and transmit split signals to the plurality of sensors.

2. The battery device of claim 1, wherein the plurality of sensors are attached to the battery by using a thermally conductive material.

3. The battery device of claim 1, wherein the transceiving circuit includes:
  an antenna configured to propagate the signals received from the plurality of sensors in a specified frequency band.

4. The battery device of claim 1, wherein the transceiving circuit includes:
  a connector electrically connected with the monitoring device and configured to transmit the signals received from the plurality of sensors to the monitoring device.

5. A battery monitoring system comprising:
a sensor device including a plurality of sensors attached to a battery;
a monitoring device; and
a transceiving circuit configured to transmit a signal received from the monitoring device to the plurality of sensors and to transmit signals received from the plurality of sensors to the monitoring device, wherein the transceiving circuit includes a transmission line configured to split the signal from the monitoring device at one node and transmit split signals to the plurality of sensors, wherein the sensor device is configured to generate a surface acoustic wave (SAW) corresponding to a first signal received in the sensor device, and configured to output a plurality of second signals corresponding to SAWs varied depending on a plurality of states of a temperature of the battery, pressure of the battery, and an electrolyte leakage of the battery, respectively, and wherein the monitoring device is configured to transmit the first signal, which is used to generate the SAW, to the sensor device, to receive the plurality of second signals from the sensor device, and to identify the states of the battery by analyzing the plurality of second signals.

6. The battery monitoring system of claim 5, wherein the monitoring device is further configured to:
distinguish a response signal for indicating a temperature variation of the battery, a response signal for indicating a pressure variation of the battery, and a response signal for indicating an electrolyte leakage state among the plurality of second signals, based on a sequence of receiving the plurality of second signals.

7. The battery monitoring system of claim 5, wherein the monitoring device is further configured to:
identify a plurality of states of a temperature variation state of the battery, a pressure variation state of the battery, and an electrolyte leakage state of the battery by identifying at least one of phase shifts and frequency shifts of the plurality of second signals based on the first signal.

8. The battery monitoring system of claim 6, wherein the monitoring device is further configured to:
restrict charging for the battery, when at least one of the temperature of the battery and the pressure of the battery is greater than or equal to a specified reference value or when the electrolyte leakage of the battery is sensed, based on a result obtained by analyzing at least one of the response signals.

9. The battery monitoring system of claim 6, wherein the monitoring device is further configured to:
transmit, to an electronic device driven using power of the battery, information for notifying that the battery is in an abnormal state, when at least one of the temperature of the battery and the pressure of the battery is greater than or equal to a specified reference value or when the electrolyte leakage of the battery is sensed, based on a result obtained by analyzing at least one of the response signals.

10. The battery monitoring system of claim 5, further comprising:
an output unit configured to output a result obtained by analyzing at least one of the plurality of second signals.

11. The battery monitoring system of claim 5, wherein the sensor device further includes a first antenna,
wherein the monitoring device includes a second antenna, and
wherein the monitoring device transmits the first signal to the sensor device and receives the plurality of second signals from the sensor device, through the first antenna and the second antenna.

12. The battery monitoring system of claim 5, wherein the sensor device and the monitoring device are electrically connected with each other through an interface for outputting power of the battery.

13. The battery monitoring system of claim 5, wherein the sensor device and the monitoring device are electrically connected with each other by using a mechanical contact fixed to a housing of an electronic device.

14. A battery monitoring method by at least one processor, the battery monitoring method comprising:
   transmitting, via a transceiving circuit, a first signal from a monitoring device to a plurality of sensors attached to a battery;
   receiving a plurality of second signals corresponding to surface acoustic wave (SAWS) which are generated differently, based on the transmitted first signal, depending on a plurality of states of a temperature state of the battery, a pressure state of the battery, and an electrolyte leakage state of the battery; and
   outputting information corresponding to a plurality of states of a temperature, pressure, and an electrolyte leakage of the battery by analyzing the second signals,
   wherein the transceiving circuit includes a transmission line configured to split the signal from the monitoring device at one node and transmit split signals to the plurality of sensors.

15. The battery monitoring method of claim 14, wherein outputting the information includes:
   distinguishing signals corresponding to the temperature, the pressure, and the electrolyte leakage of the battery, respectively, among the second signals, based on a sequence of receiving the second signals.

16. The battery monitoring method of claim 14, wherein outputting the information includes:
   identifying a plurality of states of a temperature variation state of the battery, a pressure variation state of the battery, and the electrolyte leakage state of the battery, based on at least one of phase shifts and frequency shifts of the second signals based on the first signal.

17. The battery monitoring method of claim 14, further comprising:
   restricting charging for the battery, when at least one of the temperature of the battery and the pressure of the battery is greater than or equal to a specified reference value or when the electrolyte leakage of the battery is sensed, based on a result obtained by analyzing at least one of the second signals.

* * * * *